United States Patent
Foley et al.

[19]

[11] Patent Number: 6,109,192
[45] Date of Patent: Aug. 29, 2000

[54] POWER RATE ADJUSTMENT MECHANISM FOR A SEEDING IMPLEMENT

[75] Inventors: Daniel Michael Foley; Ralph Everette Stanfill, both of Geneseo, Ill.

[73] Assignee: Deere & Company, Moline, Ill.

[21] Appl. No.: 09/399,568

[22] Filed: Sep. 20, 1999

[51] Int. Cl.$^7$ ........................................... A01C 7/20
[52] U.S. Cl. ................................. 111/177; 221/13
[58] Field of Search .............................. 221/13, 252, 185, 221/266; 222/615, 616, 623, 614; 111/177, 178, 170, 174, 200, 77, 78, 900

[56] References Cited

U.S. PATENT DOCUMENTS

| | | | |
|---|---|---|---|
| 4,122,974 | 10/1978 | Harbert et al. | 221/13 |
| 4,408,704 | 10/1983 | Steilen | 111/177 X |
| 5,025,951 | 6/1991 | Hook et al. | |
| 5,078,066 | 1/1992 | Lafferty | 111/178 |
| 5,379,706 | 1/1995 | Gage et al. | 111/174 X |

OTHER PUBLICATIONS

John Deere Parts Catalog, "750 Series Grain Drill", dated Nov. 13, 1996—p. 132.

*Primary Examiner*—Robert E. Pozzuto

[57] ABSTRACT

A power seeding rate adjustment mechanism for a seeding implement has a threaded lead screw that is rotated by an electric motor. A nut threaded onto the lead screw is fixed to the shifter lever such that when the lead screw is rotated, the nut translates along the length of the lead screw to pivot a shifter lever. The shifter lever is in turn coupled to a seed meter drive shaft to move the shaft transversely, thereby moving fluted feed wheels in or out of the seed cups. A switch carried by the operator in the pulling tractor actuates the motor. The adjustment mechanism enables the operator to make adjustments on-the-go without stopping or leaving the tractor. The motor can be disengaged from the lead screw and the screw turned by a hand crank for manual adjustment in the event of a power failure to the motor.

21 Claims, 4 Drawing Sheets

POWER RATE ADJUSTMENT MECHANISM FOR A SEEDING IMPLEMENT

BACKGROUND OF THE INVENTION

1. Field of the Invention

The present invention relates to a seeding implement and in particular to a power rate adjustment mechanism for changing the seeding rate on-the-go.

2. Description of the Related Art

Grain drills typically include a plurality of transversely spaced seed meters with fluted seed wheels driven by a ground wheel for metering seed at a rate proportional to the forward speed of the implement. Changing the seeding rate usually involves either adjusting the ratio of a transmission located between the ground wheel and a drive shaft connected to the fluted feed wheels, or moving the fluted feed wheels within the metering housings by shifting the drive shaft transversely to change the effective metering area of the wheels. The latter type of adjustment is performed by manually pivoting a shifter lever mounted to the implement and coupled to the drive shaft to move the drive shaft transversely. In a typical adjustment mechanism, the shifter lever engages a toothed quadrant to lock the shifter lever in one of several discreet adjustment positions. This holds the shifter lever, and thus the drive shaft, in place during operation. Indicia on the quadrant indicates the location of the shifter lever for reference by the operator in achieving a desired seeding rate.

It is not uncommon to equip a grain drill with sensors for one or more of the seeding rows to monitor the seeding rate and provide a corresponding display to the operator in the tractor pulling the grain drill. When the operator desires to change the seeding rate, it is necessary to stop the tractor, dismount and manually adjust the shifter lever position on the grain drill. Only when the operator returns to the tractor and begins planting again will the operator be able to view the monitor and determine if the desired seeding rate has been achieved. This is a time consuming task that reduces productivity.

SUMMARY OF THE INVENTION

Accordingly, it is an object of the present invention to provide a power rate adjustment mechanism for a seeding implement that allows the operator to adjust the seeding rate without stopping or leaving the tractor.

It is an advantage of the rate adjustment mechanism of the present invention that adjustments can be made on-the-go without stopping the implement, thus increasing productivity. The adjustment mechanism of the present invention provides a threaded lead screw that is rotated by an electric motor. A nut threaded onto the lead screw is fixed to the shifter lever such that when the lead screw is rotated, the nut translates along the length of the lead screw to pivot the shifter lever.

It is another advantage of the power rate adjustment mechanism that the seeding rate is infinitely variable.

It is a feature of the present invention that the electric motor can be disengaged from the lead screw, enabling the lead screw to be turned by a hand crank for manual adjustment if desired. Manual adjustment may be beneficial in the event that power to the electric motor is lost or in the event of motor failure. The operator is able to continue planting and make seeding rate adjustments as needed. In addition, manual adjustment remains possible for an operator that is already stopped and working on the implement and desires to make an adjustment.

It is another feature that the power seeding rate adjustment mechanism can be retrofit onto existing implements with only minor modifications.

DESCRIPTION OF THE PREFERRED EMBODIMENT

Figure 1:
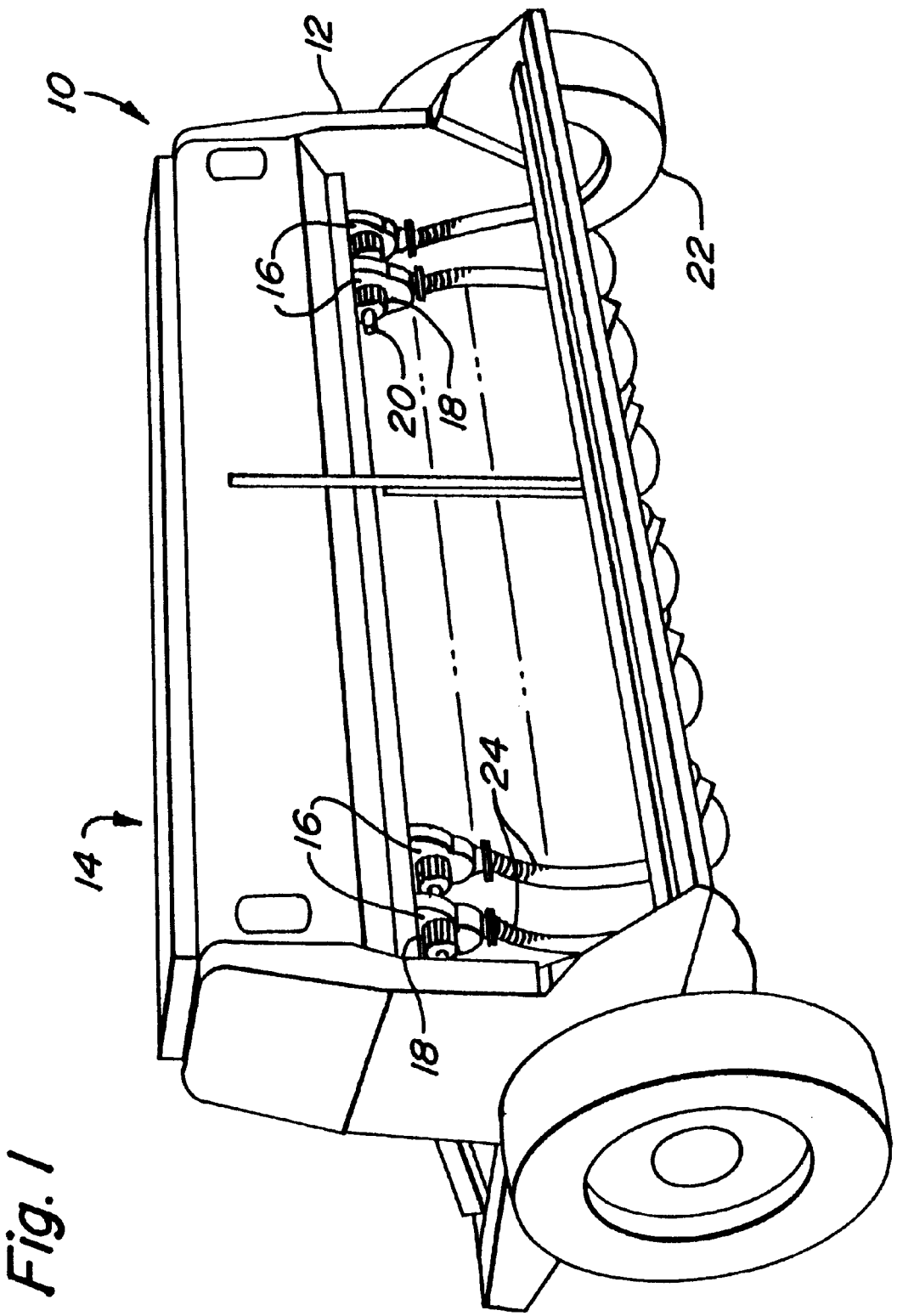
FIG. 1 is a rear perspective view of a grain drill with the power seeding rate adjustment mechanism of the present invention.

Referring to FIG. 1, a seeding implement 10 is shown that includes a frame 12 supporting a seed grain box 14. The grain box 14 opens downwardly into seed metering devices or fluted seed cups designated generally at 16. Fluted feed wheels 18 are driven by a square drive shaft 20 that in turn is operably connected to ground wheels 22 for metering the proper amount of seed into seed tubes 24 as the implement is towed forwardly through a field. The shaft 20 is transversely movable to move the feed wheels 18 into or out of their corresponding seed cups 16 to meter more or less seed as desired.

Figure 2:
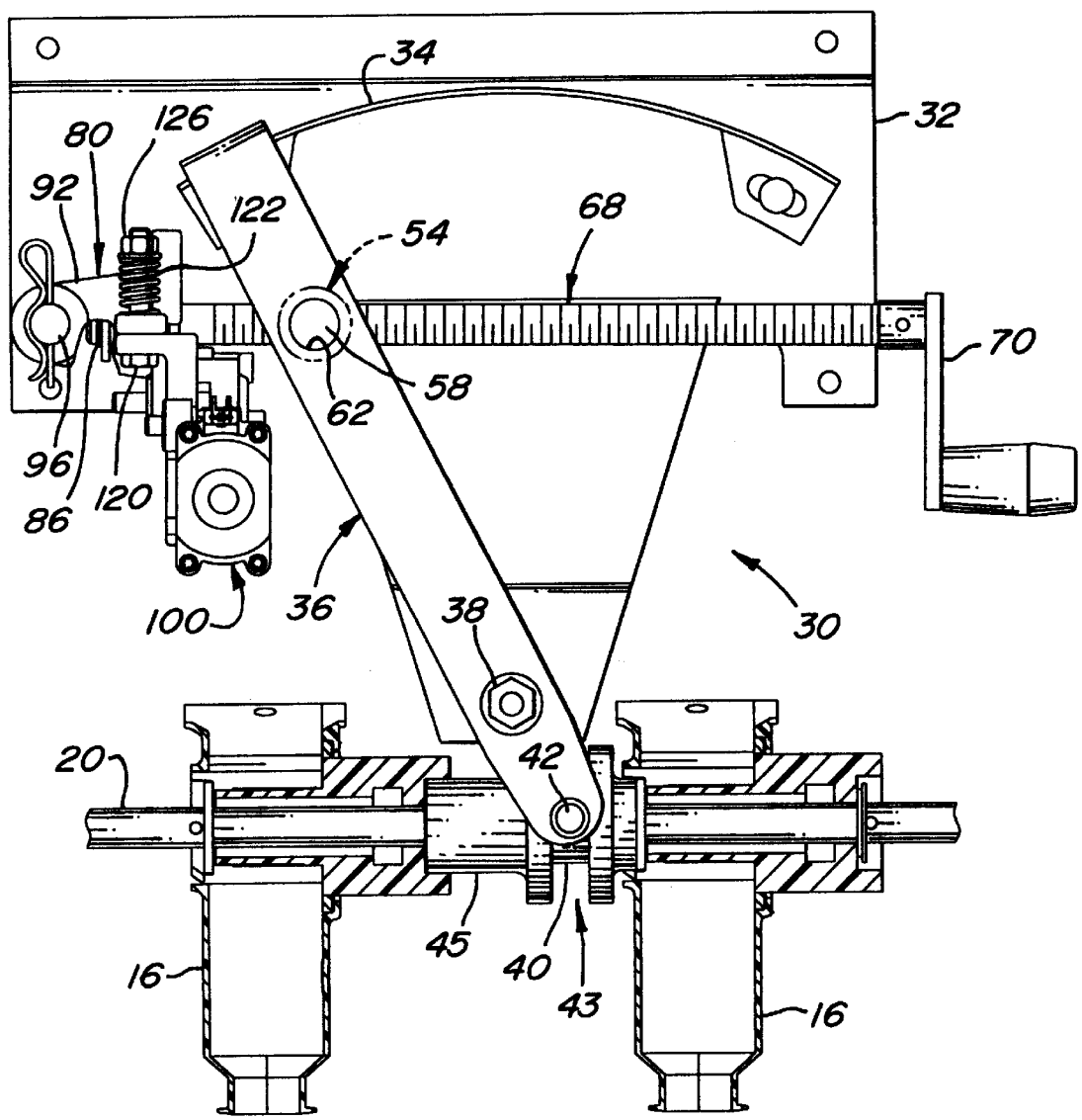
FIG. 2 is a bottom view of the power seeding rate adjustment mechanism of the present invention.
Figure 3:
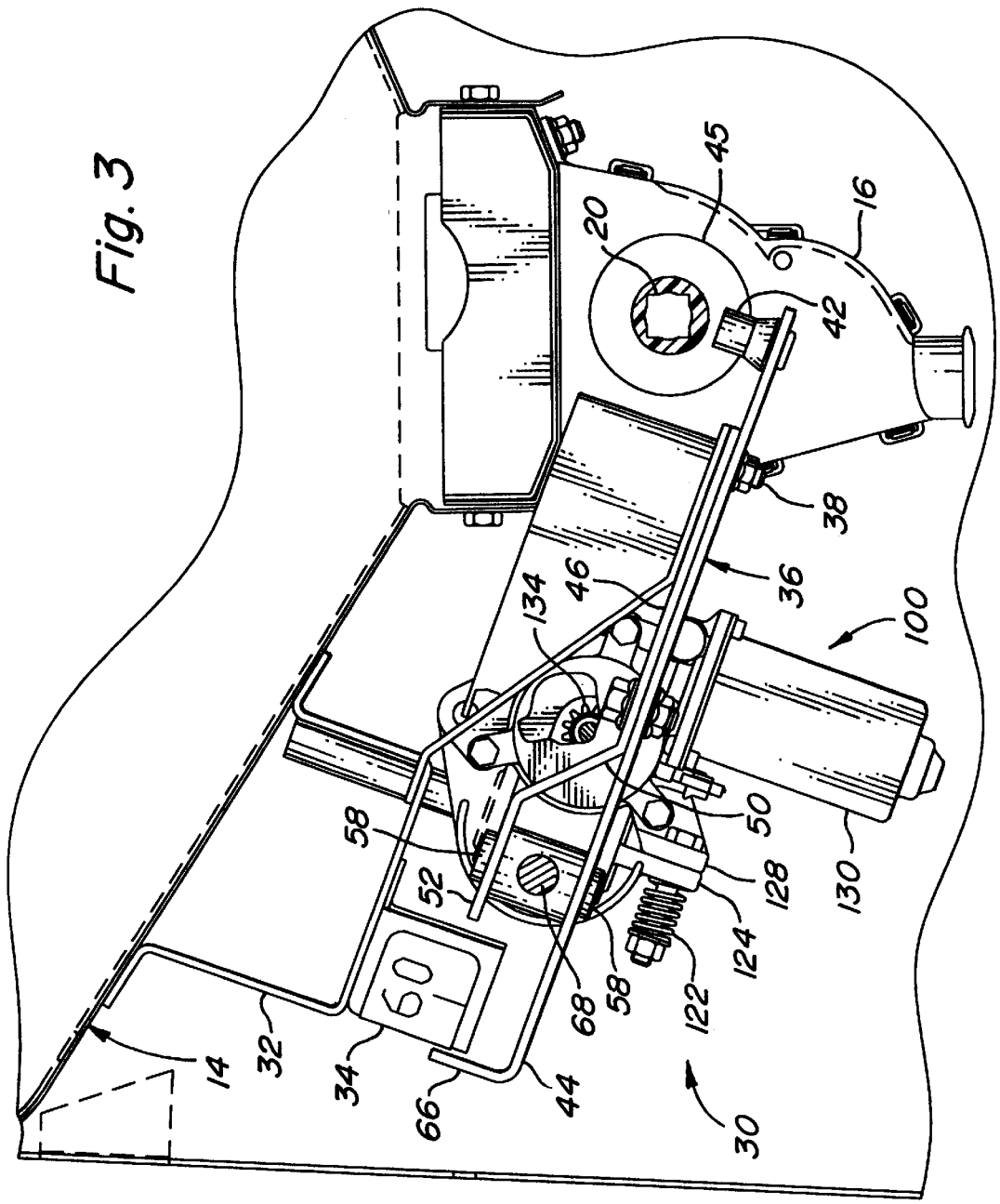
FIG. 3 is a sectional view of the adjustment mechanism as seen from the line 3—3 of FIG. 2.
Figure 4:
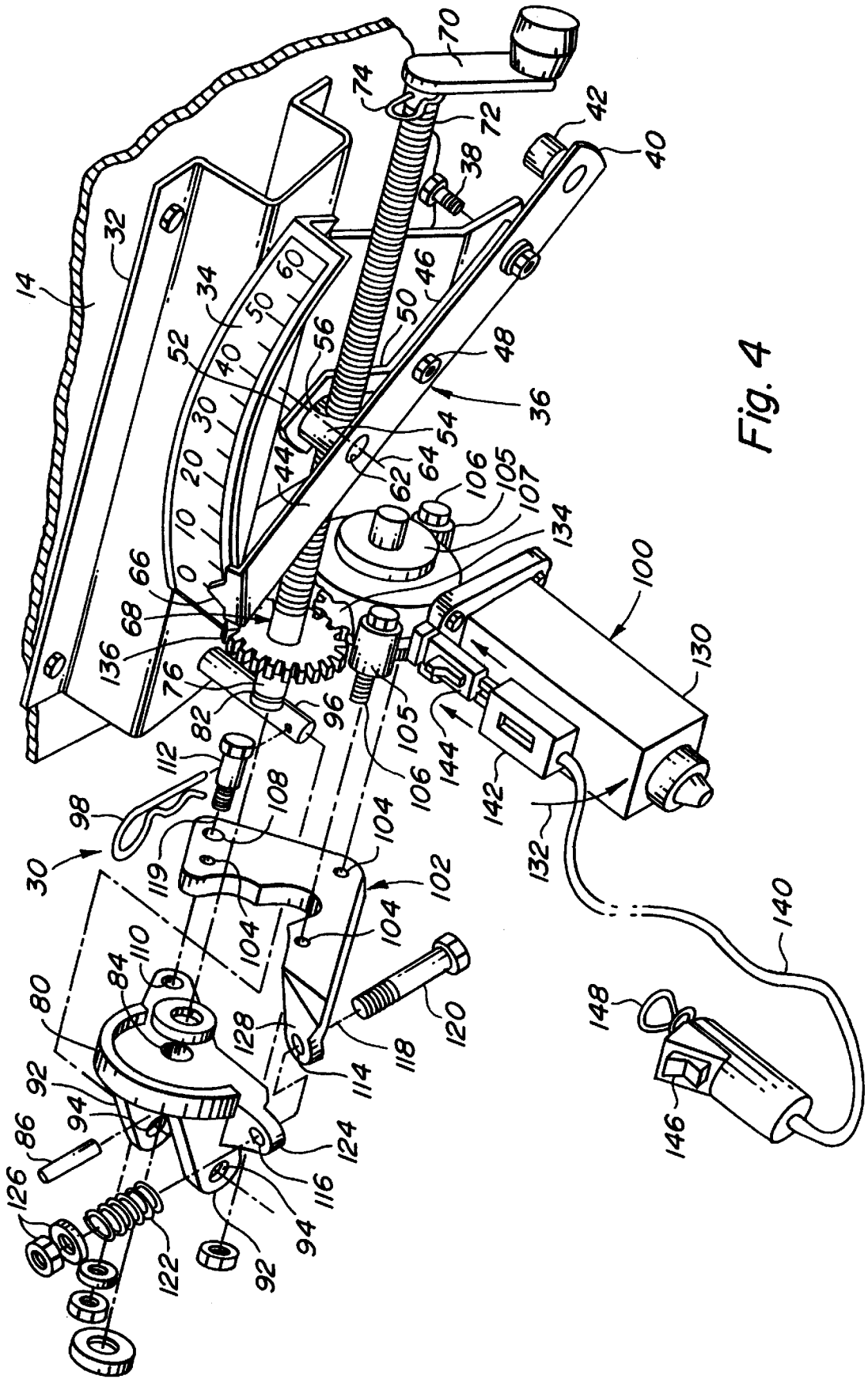
FIG. 4 is an exploded view of the power seeding rate adjustment mechanism of the present invention.

With reference to FIGS. 2–4, the power rate adjustment mechanism of the present invention is shown in greater detail and designated generally at 30. The adjustment mechanism 30 is mounted to the grain box 14 through a panel 32. A quadrant 34 bearing indicia is also bolted to the panel 32. A shifter lever 36 is pivotally mounted to the panel 32 for rotation about the axis of a pivot bolt 38. The end 40 of the shift lever includes a pin 42 that seats in a groove 43 of a collar 45 on the drive shaft 20 to move the drive shaft transversely as the shifter lever pivots about the axis of the pivot bolt 38, see FIG. 2.

The shifter lever 36 is constructed of two flat bars, a main bar 44 and a secondary bar 46. The two bars are fastened together by the pivot bolt 38 and a nut and bolt assembly 48, see FIG. 4. The secondary bar 46 has a bent transition portion 50 leading to a end portion 52 that is parallel to and spaced from the main bar 44. A threaded nut 54 is carried between the two bars of the shifter lever and has a threaded bore 56. The nut 54 has oppositely extending cylindrical mounting posts 58. The posts 58 are received in apertures 62 in the main and secondary bars 44, 46. The nut 54 is thus permitted to rotate about the axis 64 defined by the posts 58. The axis 64 is perpendicular to the axis of the threaded bore 56. The main bar 44 further includes a pointer 66 at its distal end which is disposed adjacent to the indicia on the quadrant 34 to indicate the position of the shifter lever.

An elongated lead screw 68 is threaded through the bore 56 of the nut. Rotation of the lead screw, as described below, causes the nut 54 to translate along the length of the lead screw 68. This rotates the shifter lever 36 about the pivot bolt 38 thereby moving the drive shaft 20 to adjust the seeding rate. A hand crank 70 is fastened to the end 72 of the lead screw by a retaining pin 74. The opposite end 76 of the lead screw 68 is supported in a mounting bracket 80. The screw end 76 has an annular groove 82. The screw end 76 is received within a bore 84 in the mounting bracket 80 and is retained therein by a roll pin 86 inserted in a bore (not shown) in the mounting bracket and into the groove 82 in the screw. This mounting of the screw retains the screw in the bore 84 of the mounting bracket while permitting rotation of the screw about the screw axis.

The bracket 80 has a pair of ears 92 with aligned apertures 94. The bracket 80 is attached to the panel 32 by placing the ears over a post 96 fixed to the bracket 32. A retaining clip 98 holds the mounting bracket 80 on the post 96. The bracket 80 and the screw 68 are free to pivot about the axis of the post 96. This is necessary because the nut 54 moves along an arc about the axis of the shifter lever pivot bolt 38 as the nut translates along the screw.

A motor and transmission assembly 100 is coupled to the bracket 80 through a motor mount 102. The motor mount 102 has three apertures 104 that align with bores in bosses 105 in the transmission housing 107 and receive bolts 106 to couple the motor and transmission assembly to the motor mount 102. The motor mount has another aperture 108 that is aligned with an aperture 110 in the bracket 80. A pivot bolt 112 extending through the apertures 108 and 110 pivotally couples the motor mount 102 to the bracket 80. Additional aligned aperture 114 in the motor mount 102 and aperture 116 in the bracket 80 are on an axis 118 that is oriented tangent to a circle about the axis 119 of the pivot bolt 112. A bolt 120 extends through the apertures 114,116 and is surround by a spring 122. The spring 122 is placed between the ear 124 of the bracket 80 and the nut and washer assembly 126. In this position, the spring holds the ear 128 of the motor mount against the ear 124 of the bracket 80. Grasping the motor 130 and pushing in the direction of arrow 132 will cause the motor mount 102 to rotate counter clockwise about the pivot bolt 112 as viewed in FIGS. 3 and 4.

The motor output shaft carries a drive gear 134, see FIG. 3, that engages a driven gear 136 fixed to the screw 68. Operation of the motor rotates the drive gear 134, causing the driven gear 136 and the screw 68 to rotate. Rotation of the screw 68 causes the nut 54 to translate along the screw and pivot the shifter lever. The spring 122 holds the motor mount 102 and motor and transmission assembly 100 in an operable position in which the drive gear 134 meshes with the driven gear 136, enabling the motor to rotate the screw 68. In the event of a failure of the electrical system controlling the motor 130, the operator can manually disengage the two gears by pushing on the motor as described above to rotate the motor and transmission assembly 100 counter clockwise about the pivot bolt 112. This disengages the drive and driven gears. With the two gears disengaged, the operator can turn the hand crank 70 to rotate the screw to move the shifter lever 36 and adjust the seeding rate.

An electrical wire 140 is coupled to the motor through connectors 142 and 144. The wire 140 connects the motor to a power source such as the tractor battery, not shown, and to a three position switch 146. The switch is used by an operator to actuate the motor 130 to rotate the motor in either direction. The switch housing includes a ring 148 to hang the switch from a knob on the tractor. Since the switch is not attached to the tractor, any tractor can pull the implement with the wire 140 and switch 146 simply moved to the cab of the pulling tractor.

While an electric motor has been shown for actuating the adjustment mechanism, it will be appreciated that other types of motors, including a hydraulic or pneumatic motors may be used to rotate the screw.

The power rate adjustment mechanism of the present invention allows the operator to change the seeding rate on-the-go from the tractor cab. The adjustment mechanism can be used in connection with a seed rate monitor that provides information to the operator regarding the actual seeding rate. The monitor information is then used in making the necessary or desired adjustments.

The power seeding rate adjustment mechanism can also be used with automated variable rate seeding. In such a case, the switch 146 would be integrated into a system controller that changes the seeding rate based on various input information, including field position.

The power rate adjustment mechanism can be retrofit onto existing grain drills by replacing the existing panel and shifter lever with panel 32 and shifter lever 36 and by adding the other components of the adjustment mechanism 30 as described above.

The invention should not be limited to the above-described embodiment, but should be limited solely by the claims that follow.

We claim:

1. In a seeding implement having a plurality of transversely spaced seed meters each with a rotatable metering member supported within a metering housing and a transversely movable drive shaft operably connected to the rotatable metering members wherein the rotatable members are transversely movable with the drive shaft for changing the seeding rate of the meters, a power seeding rate adjustment mechanism for transversely moving the drive shaft comprising:

a shifter lever pivotally mounted to the seeding implement, the shifter lever operatively coupled to the drive shaft to transversely move the drive shaft upon pivoting of the shifter lever;

an elongated threaded screw carried by the seeding implement for rotation about a longitudinal axis of the screw;

a motor drivingly coupled to the screw to rotate the screw; and a nut threaded onto the screw and mounted to the shifter lever to prevent rotation of the nut whereby when the screw is rotated, the nut translates along the length of the screw to pivot the shifter lever and thereby move the drive shaft.

2. The adjustment mechanism as defined by claim 1 further comprising a switch located remotely from the motor and connected thereto electrically to actuate the motor.

3. The adjustment mechanism as defined by claim 1 wherein the motor is an electric motor.

4. The adjustment mechanism as defined by claim 1 further comprising a hand crank attached to the screw for manual rotation of the screw to pivot the shifter lever.

5. The adjustment mechanism as defined by claim 4 wherein the motor is manually decoupled from the screw to facilitate manual rotation of the screw by the and crank.

6. The adjustment mechanism as defined by claim 1 wherein the motor is coupled to the screw through a drive gear rotated by the motor that meshed with a driven gear fixed to the screw to rotate the screw.

7. The adjustment mechanism as defined by claim 6 wherein the motor is pivotally mounted to the implement and biased into a position in which the drive gear meshes with the driven gear.

8. The adjustment mechanism as defined by claim 1 further comprising a mounting bracket pivotally carried by the seeding implement with one end of the screw rotatable supported by the mounting bracket and the motor supported by the mounting bracket.

9. The adjustment mechanism as defined by claim 8 wherein the motor rotates a drive gear that meshes with a driven gear fixed to the screw to rotate the screw.

10. The adjustment mechanism as defined by claim 9 further comprising a motor mount pivotally carried by the mounting bracket and supporting the motor, and a bias spring operatively associated with the motor mount and the mounting bracket for urging the drive gear into meshing engagement with the driven gear.

11. The adjustment mechanism as defined by claim 10 further comprising a hand crank attached to the screw for manual rotation of the screw to pivot the shifter lever.

12. The adjustment mechanism as defined by claim 8 further comprising a sitch located remotely from the motor and connected thereto electrically to actuate the motor.

13. A seeding implement comprising:
a plurality of transversely spaced seed meters each with a rotatable metering member supported within a metering housing;
a transversely movable drive shaft operably connected to the rotatable metering members wherein the rotatable members are transversely movable with the drive shaft for changing the seeding rate of the meters;
a shifter lever pivotally mounted to the seeding implement and operatively coupled to the drive shaft to transversely move the drive shaft upon pivoting of the shifter lever;
an elongated threaded screw carried by the seeding implement for rotation about a longitudinal axis of the screw;
a motor drivingly coupled to the screw to rotate the screw; and
a nut threaded onto the screw and mounted to the shifter lever to prevent rotation of the nut whereby when the screw is rotated, the nut translates along the length of the screw to pivot the shifter lever and thereby move the drive shaft.

14. The seeding implement as defined by claim 13 further comprising a switch located remotely from the motor and connected thereto electrically to actuate the motor.

15. The seeding implement as defined by claim 13 further comprising a hand crank attached to the screw for manual rotation of the screw to pivot the shifter lever.

16. The seeding implement as defined by claim 15 wherein the motor is manually decoupled from the screw to facilitate manual rotation of the screw by the hand crank.

17. The seeding implement as defined by claim 13 wherein the motor is coupled to the screw through a drive gear rotated by the motor that meshed with a driven gear fixed to the screw to rotate the screw.

18. The seeding implement as defined by claim 17 wherein the motor is pivotally mounted to the implement and biased into a position in which the drive gear meshes with the driven gear.

19. The seeding implement as defined by claim 13 further comprising a mounting bracket pivotally carried by the seeding implement with one end of the screw rotatable supported by the mounting bracket and the motor supported by the mounting bracket.

20. The seeding implement as defined by claim 19 wherein the motor rotates a drive gear that meshes with a driven gear fixed to the screw to rotate the screw.

21. The seeding implement as defined by claim 20 further comprising a motor mount pivotally carried by the mounting bracket and supporting the motor, and a bias spring operatively associated with the motor mount and the mounting bracket for urging the drive gear into meshing engagement with the driven gear.

* * * * *